United States Patent [19]

Tunnicliffe

[11] Patent Number: 6,055,240
[45] Date of Patent: Apr. 25, 2000

[54] METHOD AND APPARATUS FOR MESSAGE MANAGEMENT

[75] Inventor: Andrew Tunnicliffe, Sawbridgeworth, United Kingdom

[73] Assignee: Nortel Networks Corporation, Montreal, Canada

[21] Appl. No.: 08/874,010

[22] Filed: Jun. 12, 1997

[51] Int. Cl.$^7$ ................................................ H04Q 11/04
[52] U.S. Cl. .................. 370/428; 370/235; 370/252; 370/230; 370/469; 379/112; 379/114
[58] Field of Search .................... 370/392, 398, 370/419, 428, 429, 469, 235, 230, 231, 238, 252; 379/90.01, 112, 114, 115, 100.13, 100.15

[56] References Cited

U.S. PATENT DOCUMENTS

| | | | |
|---|---|---|---|
| 4,837,798 | 6/1989 | Cohen et al. | 379/88 |
| 5,448,564 | 9/1995 | Thor | 370/392 |
| 5,533,017 | 7/1996 | Thor | 370/419 |
| 5,682,460 | 10/1997 | Hyziak et al. | 395/600 |
| 5,850,395 | 12/1998 | Hauser et al. | 370/398 |
| 5,862,203 | 1/1999 | Wulkan et al. | 379/114 |

FOREIGN PATENT DOCUMENTS

| | | | |
|---|---|---|---|
| 0695075 | 1/1996 | European Pat. Off. | H04M 11/06 |
| WO 95/15635 | 8/1995 | WIPO | H04L 12/24 |

OTHER PUBLICATIONS

Rosenchein and Zoltkin, Chapter 1 from "Rules of Encounter—designing conventions for automated negotiation among computers." MIT Press, 1994.

Paul Kearney, Oct. 1996, "Personal Agents: A walk on the client side" Sharp Laboratories of Europe Ltd. Presented at a workshop at Queen Mary Westfield College, UK.

S Ramanathan et al "Architectures for personalized multimedia" IEEE Multimedia, vol. 1, No. 1, 1994 Los Alaminos US, pp. 37–46, XP000440877.

EPO standard search report.

*Primary Examiner*—Dang Ton
*Assistant Examiner*—Shick Hom
*Attorney, Agent, or Firm*—Lee, Mann, Smith, McWilliams, Sweeney & Ohlson

[57] ABSTRACT

A method of message management in a communications network. The method comprises the steps of: (i) storing information comprising information about the communications network and user messages for message formats; (ii) storing at least one user message in one of a plurality of formats, the message being required to be sent using the communications network; (iii) negotiating, using one of the automated agents with one or more other of the automated agents; and (iv) using the one automated agent, determining, on the basis of the negotiation and the information, which of a second plurality of formats to send the user message in.

18 Claims, 3 Drawing Sheets

```
┌─────────────────────────────────────────────────┐
│ STORE INFORMATION ABOUT A COMMUNICATIONS NETWORK│
│ AND USER PREFERENCES FOR MESSAGE FORMATS        │
└─────────────────────────────────────────────────┘
                        │
┌─────────────────────────────────────────────────┐
│ STORE AT LEAST ONE USER MESSAGE IN ONE OF A FIRST│
│ PLURALITY OF FORMATS, SAID USER MESSAGE EITHER  │
│ BEING REQUIRED TO BE SENT OR HAVING BEEN RECEIVED│
│ FROM THE COMMUNICATIONS NETWORK                 │
└─────────────────────────────────────────────────┘
                        │
┌─────────────────────────────────────────────────┐
│ NEGOTIATE, USING ONE AUTOMATED AGENT WITH ONE OR│
│ MORE OTHER AUTOMATED AGENTS                     │
└─────────────────────────────────────────────────┘
                        │
┌─────────────────────────────────────────────────┐
│ USING SAID ONE AUTOMATED AGENT, DETERMINING, ON THE│
│ BASIS OF SAID NEGOTIATION AND SAID INFORMATION, │
│ WHICH OF A SECOND PLURALITY OF FORMATS TO SEND THE│
│ USER MESSAGE IN                                 │
└─────────────────────────────────────────────────┘
```

METHOD AND APPARATUS FOR MESSAGE MANAGEMENT

BACKGROUND OF THE INVENTION

1. Field of the Invention

The invention relates to a method and apparatus for message management for use with an entity in a communications network. The invention is especially useful for sending and receiving messages in a cost efficient manner and/or in a user friendly manner.

2. Description of the Prior Art

With today's communication technology there is a wide variety of formats for sending and receiving messages. For example, fax, E-mail, Internet web pages, short message services (SMS) and voice transmission. As well as this there are many different service providers, each with different tariffing rates and pricing policies. This makes it very time consuming and complex for a user to achieve the most cost efficient method for sending and receiving messages. In order to do this the user needs to obtain information about the different tariffing rates from the different service providers. This information is typically very complex, including for example, different tariffs for different times of the day and/or different destinations as well different message formats such as fax and E-mail. Even when this information is obtained it may become out of date after a relatively short time.

Once information about costs has been found, it must be compared and analysed in order to determine how a minimum cost can be achieved. Other requirements of the user must also be taken into account at this stage, for example, how urgent the message is. This is a lengthy procedure which typically involves many different combinations of factors.

When a minimum cost strategy has been worked out, it may then be found that this does not involve the type of message format that the user prefers. For example, it may be cheaper to send a particular message by fax in a certain situation, rather than by voice. However, the user may prefer to send messages only in voice format. The preferences of the person receiving the message may also be at odds with the format identified as cheapest for the particular situation. If the message is sent in a non-preferred format, it may not be dealt with as quickly as required.

Even when cost is not an important factor for the user, preferred message formats can be very important. For example a user may prefer to send all messages in voice format for speed of constructing the message and to receive messages in a text format, in order that hard copies of the messages can be kept. Users with impaired vision may also require all messages to be received in voice format. Known systems for converting between message formats such as voice, E-mail and fax can be used in these situations, although they must be managed by the user and do not automatically take account of sender's and receiver's preferences.

One problem for message management is that it involves interaction with a communications network that is a distributed, heterogeneous system. A communications network is typically heterogeneous in nature with many different service providers and as already described, there is a wide variety of formats for sending and receiving messages. One approach to managing distributed, heterogeneous systems such as this has been to use so-called agents and agent systems. Rather than having centralised control of a system, such as a communications network, a plurality of autonomous agents are able to act in their environment, say a communications network. The net effect of the agents' actions leads to control of the system and this can be especially effective when repeated interactions between agents occurs and beneficial emergent results are achieved. Each agent receives stimuli from its environment and is able to perform actions which alter its environment. An agent "decides" what actions to perform based upon its own goals which may be learned, or may be pre-specified. An agent's environment is comprised of other agents with which it is able to communicate, for example to request information or to negotiate. When this type of system becomes large scale, beneficial emergent properties may result and distributed control of a complex heterogeneous system can be achieved.

Some examples of these types of systems and the use of autonomous agents in control of complex, dynamic systems are described in the following documents:

- Chapter I from Rosenschein & Zoltkin (1994) "Rules of Encounter—Designing Conventions for Automated Negotiation Among Computers" MIT Press.
- Paul Kearney, October 1996, "Personal Agents: A Walk on the Client Side" Sharp Laboratories of Europe Limited. Presented at Queen Mary and Westfield College Open Workshop, UK.
- WO9515635 describes a system of individual software agents which in combination provide communications network management. In this document, the term "Communications Network Management" is used to refer to tasks such as ensuring the supply and delivery of services and determining amounts for billing purposes. WO9515635 is not related to management services for individual users or to message management services. Agent based methods have not previously been applied to message management, for example in situations where it is desired to reduce costs and/or provide messages in user-preferred formats.

By their very nature, agent based systems produce outcomes which are difficult to predict or anticipate as this can make them difficult to implement and maintain. It is difficult to design individual agents in such a way that interaction between many agents in use, will produce the desired results. Typically, trial and error methods are used. This is especially difficult because with repeated interactions emergent effects are produced which may not have been anticipated. Similarly, if an error in an individual agent occurs, this may go undetected for some time, because it is difficult to distinguish a natural change in the agent environment from an error. These problems are especially significant for message management systems. It is necessary to ensure that messages are not lost and they reach their destinations by the required time. Errors should be quickly detected and the system easy to maintain and operate.

It is accordingly an object of the present invention to provide a method and apparatus for message management and particularly for use with an entity in a communications network which overcomes or at least mitigates one or more of the problems noted above.

SUMMARY OF THE INVENTION

According to a first aspect of the present invention there is provided a method of message management in a communications network, said method comprising the steps of:

(i) storing information comprising information about the communications network;

(ii) storing at least one message in one of a plurality of formats, said message(s) being required to be sent using the communications network;

(iii) determining, on the basis of the information, which of a plurality of formats to send the message(s) in.

A corresponding terminal for connection into a communications network comprises;

(i) a storage device arranged to store information that comprises information about the communications network;

(ii) a second storage device arranged to store at least one message in one of a plurality of formats, said message(s) being required to be sent using the communications network; and (iii) a processor arranged to determine, on the basis of the information, which of a plurality of formats to send the message(s) in.

This provides the advantage that messages can be created and stored ready for sending and then sent at a time which is cost efficient. Information about the communications network which can include for example cost information and information about performance of the network can be used to determine the formats for sending the messages.

Preferably the information further comprises preferences for message formats. This provides the advantage that the information about the formats that the sender or the receiver of the message prefers is taken into account when determining a message format. It is also preferred that the method further comprises the step of determining, on the basis of the information, time(s) at which to send the message(s). This provides the advantage that times for sending the messages can be easily and quickly determined in order to achieve for example cost efficiency and/or optimum transmission times.

Preferably the method further comprises the step of converting the message(s) to the determined format for sending. This simplifies operation for the user who is able to leave the system whilst it converts the messages to a cost efficient and preferred format for sending. It is also possible to carry out other operations such as web browsing using the system, whilst the system performs personal messaging services on the user's behalf.

It is also preferred that the method further comprises the step of automatically sending the message(s) at the determined time(s). This provides the advantage that the user is able to leave the system unattended whilst messages are automatically sent at for example cost efficient and/or preferred time(s).

Preferably the method further comprises the steps of:

(i) obtaining information about past message transmissions; and (ii) modifying the stored information on the basis of the past message transmission information. This provides the advantage that the method is effectively able to learn from past experience. The information such as which format was used for sending a message to a particular destination at a particular time can be taken into account when sending future messages. Similarly information about messages that have been received can be used.

Preferably said step (i) of storing information further comprises the step of:

(i) sending a request for information to an entity in the communications network, said information being associated with that entity;

(ii) receiving a reply to the request;

(iii) updating the stored information according to the reply.

This provides the advantage that information can be obtained from other entities in the communications network.

For example these could be terminals that are used by other users. In one example it would be possible to request information about the preferred format that another user of the communications network prefers to receive his or her messages in. Another example would be sending a request for information about pricing and tariffs to a service provider. In this way up to date information can be obtained. This information can be obtained automatically without the users intervention.

It is also preferred that said step (i) of storing information about preferences further comprises the step of:

(i) sending a request for information to a plurality of entities in the communications network, said information being associated with the entities;

(ii) receiving replies to the request;

(iii) updating the stored information according to the replies.

This provides the advantage that information from for example, a number of different service providers can be obtained in order to determine the most cost efficient formats and times for sending and receiving messages.

According to another aspect of the present invention there is provided a method of message management in a communications network, said method comprising the steps of:

(i) storing information comprising information about the communications network;

(ii) storing at least one message received from the communications network in one of a plurality of formats; and (iii) determining, on the basis of the information, which of a plurality of formats to display the message(s) in.

This provides the advantage that messages which are received in one of a plurality of formats can be stored using the method and a format for displaying the messages which is preferred by the user and/or is cost efficient and can be easily and quickly determined.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 1:
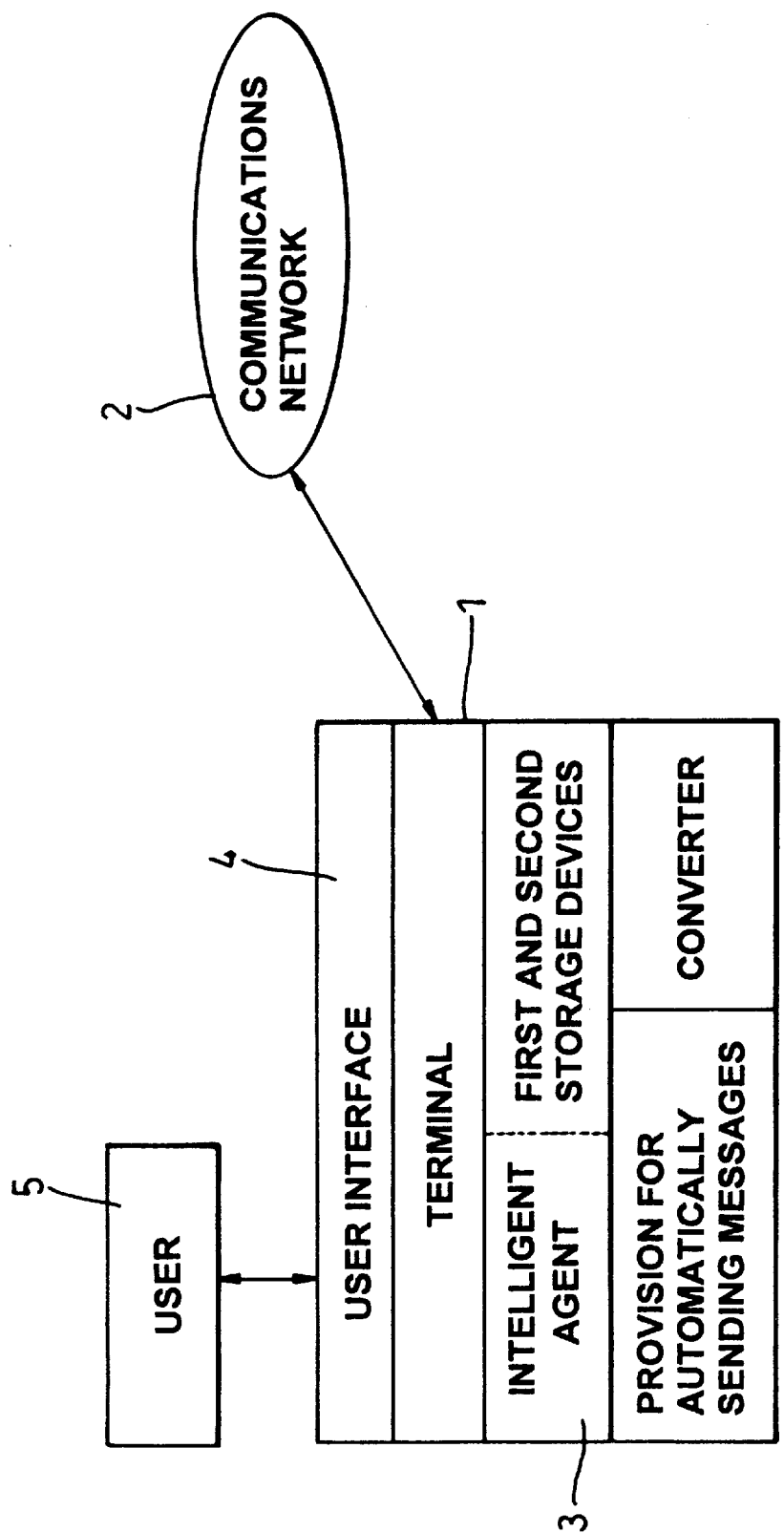
FIG. 1 is a general schematic diagram of a terminal and a communications network.

The invention involves a personal message management system that uses one or more intelligent agents. A user or subscriber to a communications network has a terminal 1 (as shown in FIG. 1) for connection into the communications network 2. For example, the terminal 1 could be a telephone, a fax machine or a computer. Using the terminal 1 the user is able to send and receive messages, to and from the communications network 2. The communications network 2 includes terminals for other users.

An intelligent agent 3 is incorporated into terminal 1 and helps to provide message management for the user. Alternatively, the intelligent agent 3 is incorporated within the communications network 2. For example, the user may subscribe to a personal message management service provided within the network 2.

The agent 3 is provided with, or obtains for itself, information about its environment, the communications network 2 and the user 5. This information can be information about costs, or how busy certain parts of the network are and information about the user, such as past behaviours and preferences for message formats. On the basis of this information, the agent 3 is then able to manage messages on behalf of the user. For example, this can involve determining which formats and times at which to send messages in order to keep costs low whilst ensuring delivery, and taking account of sender and receiver message formats. The agent 3 also determines how best to prioritise and display received messages. It is also possible for the agent 3 to act on behalf of the user 5 by actively seeking information from service providers and/or other agents 3 in the communications network 2. The agent 3 may also have the ability to negotiate with other agents in the communications network 2.

Incorporated within the terminal 1 and/or the communications network 2 is a facility to convert between message formats, such as voice, email, fax, short message service (SMS) and web-pages. The agent 3 can make use of these facilities to automatically convert between message formats, in order to send or display messages in a preferred format. For example, the user may compose the message in a convenient format e.g. voice and then the agent automatically converts the voice format message to fax for cost efficient sending. Messages can also be stored, prior to display or being sent, either in the terminal 1 and/or at a node in the communications network 2. The agent 3 makes use of a facility for automatically sending stored messages (either on or off-line). This enables messages to be sent at cost-effective times and/or according to priority. For example, a batch of messages could be sent to reduce costs. The facility for automatically sending messages may either be located in the terminal 1 or in the communications network 2.

Figure 2:
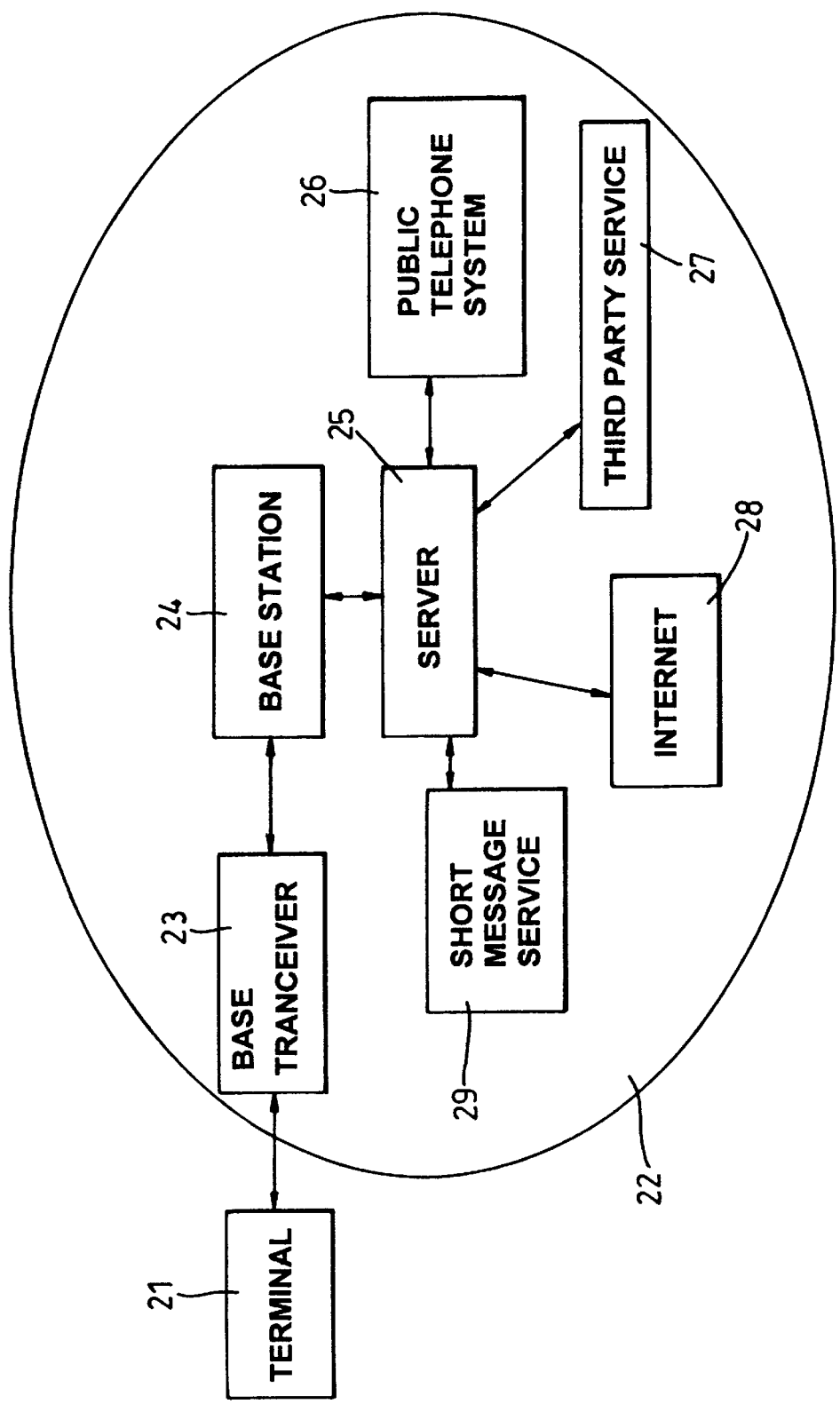
FIG. 2 shows the terminal and communications network of FIG. 1 and some components of the communications network.

As shown in FIG. 2, the communications network 2 can incorporate many different types of component. In the situation that the terminal 21 is a mobile telephone, this can be linked with a base transceiver 23 as shown in FIG. 2. The base transceiver 23 is linked (via a base station 24) to a server 25 that in turn provides connections into a public telephone system 26, third party service 27, the Internet 28, a short message service 29 and other supporting telecommunications systems as necessary (not shown). This system of connections (shown in FIG. 2) in the communications network is just one example. Other combinations and connections between components could be used. In this example, the communications network is heterogeneous in nature, which is typically the case. That is many different types of component and service provider go to make up the network. The network is also a distributed system in the sense that there is no overall control or management of the system; rather organisation is effected locally at nodes or components in the network. Other terminals are provided in the communications network 2, for example as part of the public telephone system 26 or the Internet 28.

As already mentioned, an intelligent agent 3 is incorporated either within the terminal 21 or for example in a server 25 in the communications network 2. Information about the communications network and about the user's preferences is stored (either in the terminal 21 or the communications network 2 or both) and this information is available to the agent 3. For example, the user may configure the agent 3 according to his or her own preferences. This involves the user inputting the information to the terminal 21 or server 25 for example, using a graphical user interface. The user could input information such as the number of messages that should be required for a "batch" of messages. Alternatively, the agent 3 can comprise a knowledge based system which contains rules about known preferences of the sender and receivers. This knowledge based system can be pre-specified or alternatively it may be adaptive and able to learn from past message sending/receiving behaviour with the terminal 21. Another possibility is that the agent 3 may receive information from the network. For example, about conditions, tariff options, and current offers. For some situations the agent 3 may negotiate to obtain a good economic deal. For example, a dialogue between an agent 3 and a proxy agent acting on behalf of a network operator is possible. In this way the operator is able to make efficient utilisation of the network 2 and the subscriber achieves the best economic deal. This is especially useful when multiple operators can be used.

An example of use of the personal message management system is now described. A user or subscriber 5 constructs messages to be sent in one of a variety of formats. For example, the user may prefer to construct all messages in voice format. The constructed messages are then stored, for example, on the terminal 1. The agent or assistant 3 then assimilates all or some of the following information.

the urgency of the messages to be sent (this can be determined using information such as the time of day, or the destination for the message).

the preference mode of the subscriber operation (for example, this can be voice, text or whatever mode is preferred at a certain time and situation, such as driving to work from 8.30 am to 9 am).

information about the receiver's preferences for example, who the receiver is, how they operate and what equipment they use. For example, the agent may have information that receiver Andrew, prefers to read email messages at 9.00 am each day and that he has no fax machine.

information about network conditions, such as whether particular parts of the network are congested. Information about variable tariffs such as cheap rate periods, peak traffic utilisation (i.e. the busiest times), delays (for example, delays in downloading images from a web page, and delays in sending email messages during busy periods) and information about any network options which are available such as Internet, SMS, voice.

information about the subscriber's billing preferences or agreements. For example, this could be information such as "subscriber X provides 2 minutes of free usage time when certain conditions are met".

information about the subscriber's preferred budget.

Once the agent or assistant 3 has assimilated the information it determines, on the basis of the information:

an appropriate format for the message, such that costs, and sender and receiver preferences are taken into account, and a convenient time to send the message.

The agent or assistant 3 then automatically converts the message to the required format and sends the message at the determined time.

Received messages are stored for example on the terminal 1 or on the server 25. The agent or assistant 3 then assimilates all or some of the following information:

the urgency of the received message.

the user's preferences for viewing received messages.

if the received messages are stored on a server 25 information about costs or downloading the messages to the terminal 1 are also taken into account. In this case information about congestion and other factors to do with the network are considered.

Once the agent or assistant 3 has assimilated the information it determines an appropriate format for displaying a message and a convenient time for downloading the message from the server 25 if required. The agent or assistant 3 then automatically converts the message to the required display format and displays the message at a convenient time. The agent or assistant 3 also uses information about the urgency of the messages in order to prioritise them.

When determining a convenient time to send a message the agent 3 takes into account network conditions, whether the message should be sent as a batch or whether to piggy-back an urgent message. The term "piggy-back" is used to refer to situations such as when a batch is incomplete but is sent anyway when an urgent message is created. This can enable stored messages to be sent together with the urgent one; the urgent message will be costly anyway and the relative increase in cost for sending the queued messages will be slight. Interruptions from incoming calls and periods when the terminal 3 is connected to a server 25 should also be taken into account.

The personal message management system has a number of advantages including:

(i) providing a convenient, personalised, assistant to the subscriber or user.

(ii) integrating different services and consolidating them for the user's convenient.

(iii) operating conveniently through customisation, personalisation and/or adapting to the subscriber's behaviour and preferences.

(iv) operating efficiently by understanding how best to utilise the network, taking advantage of tariff information, behaving opportunistically and pro-actively when favourable network conditions apply.

The agent 3 may comprise software such as a knowledge based system. As described this can be incorporated into a server 25 within the communications network. In this situation a user would subscribe to the message management service and may utilise this service by dialling into the server 25 from the terminal 21. This has the advantage that the agent 3 would be cheaper to implement and maintain on the server 25 rather than on many individual terminals 21. Another advantage is that charging for the personal message management service would be easier to determine because the system is centralised. Alternatively, the agent 3 may be incorporated into the terminal for example a telephone handset. This has the advantage that individual users can have their own versions with their own settings etc., for the agent configuration. This gives users flexibility and freedom. Another advantage is that costs for the user are reduced. This is because the user is not required to dial into the server in order to make use of the message management service.

As already described the message management system has a facility for converting between different message formats. It is also possible for the message management system to redirect messages to another terminal 21. For example a message that has been converted to a text format may be automatically redirected to a printer.

A range of applications are within the scope of the invention. These include situations in which it is required to manage messages that are sent or received by an entity in a communications network. For example, for managing messages sent or received by a mobile telephone handset which has a facility for converting between different message formats.

Drawings

1. With reference to paragraph 1 of the Office Action, please consider the drawings as formal in order that any problems may be communicated to the Applicant as soon as possible.

2. Reconsideration of the requirement to label FIGS. 1 and 2 as prior art is requested. FIG. 1 illustrates an intelligent agent (3) for message management incorporated in a terminal and shows the relationship between these elements and a communications network 2. This is described and explained on page 7 paragraphs 4, 5 and 6, and because use of an intelligent agent (3) for message management in this way is new (see below) FIG. 1 is not prior art. Similarly, FIG. 2 illustrates a communication network which incorporates an intelligent agent (3) either in a terminal (21) or a server (25) (page 9 lines 4–6) and therefore is not prior art.

3+4. Proposed drawing corrections are submitted herewith. FIG. 1 has been amended to show a first and second storage device, a converter, and provision for automatically sending messages. Support for these amendments is found at page 8 lines 7 to 14 (converter); page 8 lines 16 to 21 (provision for automatically sending messages); page 8 lines 14 to 16 (storage device for storing messages) and page 9 lines 6 to 8 (storage device for storing information about the communications network and user preferences). New FIG. 3 is added and basis for FIG. 3 is found in original claims 1 and 15 as well as at page 9 lines 6 to 9, 27 to 31; page 10 lines 21 to 24 and 30 to 31 and page 11 lines 4 to 7.

Figure 3:
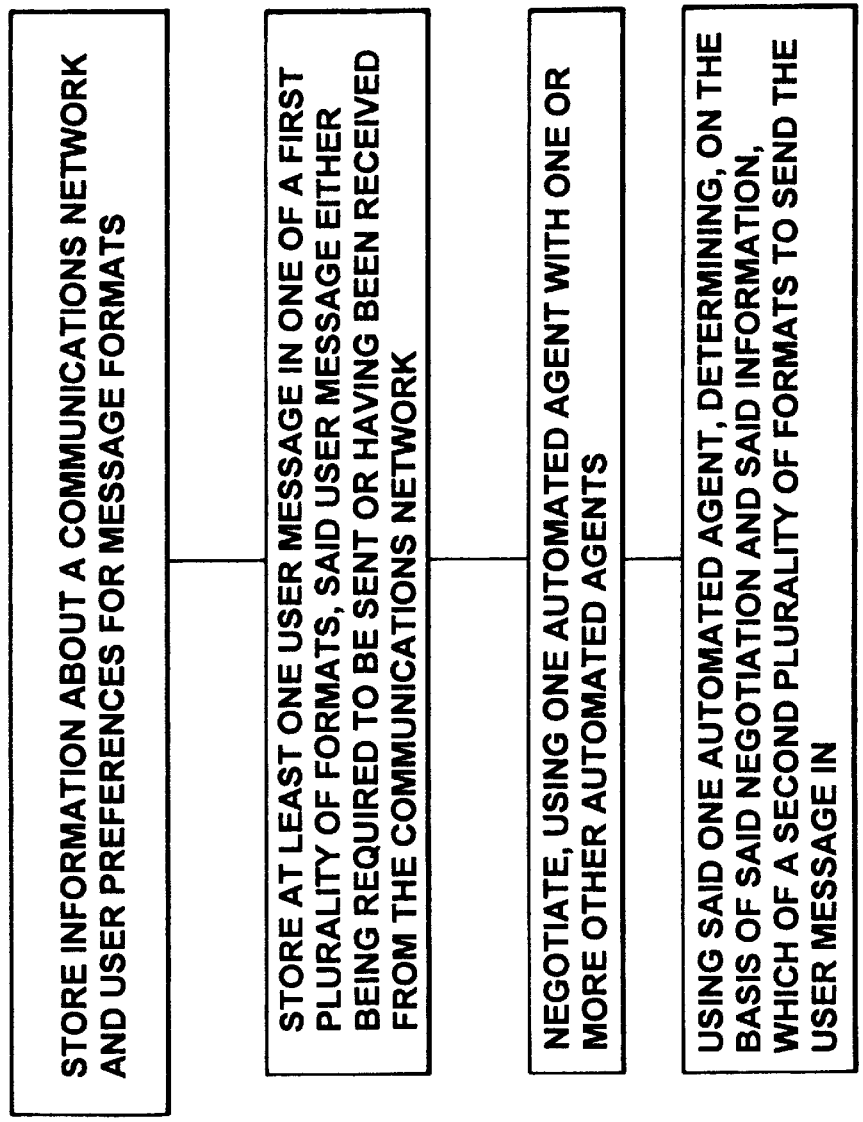
FIG. 3 illustrates a method of message management.

A FIG. 3 description has been added to page 7 in the brief description of the drawings.

6. Claims 1–15 and 17–19 have been amended as requested by the Examiner.

Claim Rejections—35 U.S.C. §112

7. Referring to the matters raised in paragraph 7, claim 1 has been amended to refer to user preferences in claim 7 now has antecedent basis.

In claim 8 "the past message transmission information" has antecedent basis in claim 8 paragraph (I).

claim 19 has been amended to depend on claim 17 so that "the determined time" has antecedent basis.

Claims 15 and 16 have been amended to refer to first and second pluralities of formats for clarity.

Since claim 16 has been amended to overcome the rejection for being indefinite, claim 18 is now acceptable.

Claim Rejections—35 U.S.C. §102

The present application relates to a message management system for user messages rather than control messages. User messages such as e-mails, faxes, voice calls etc. are distinct from control messages which are internal to a communications system and whose function is to help control and manage that communications system. For example, pages 1 to 2 of the description of the present application describe problems encountered by users that are addressed by the message management system of the present invention. In contrast, THOR (U.S. Pat. No. 5,448,564) relates to a modular architecture for fast-packet networks and THOR (U.S. Pat. No. 5,533,017) to a line interface device. Neither THOR document relates to the use of automated intelligent agents for user message management. In the THOR documents, many of the items such as frames refer to control messages that are internal to the communications network and are not messages that are accessed by users.

THOR does not describe use of automated agents is specified in amended claims 1, 15 and 16. Therefore claims 1, 15 and 16 are novel over THOR. Although THOR mentions intelligent devices such as PCs in endpoints these are arranged to detect loss of data and recover this lost data. These PCs do not determine which of a plurality of formats to send a user message in as specified in claims 1, 15 and 16. For example, the HDLC frame format data is not transmitted in a format chosen on the basis of user performances. The frame translation process described in THOR does not concern user preferences but rather relates to internal message protocols of a communications system.

Claim 1 as amended also specifies the feature of original claim 2 which the Examiner has acknowledged as being novel over THOR, None of the other cited documents (Wulkan et al U.S. Pat. No. 5,862,203; and Hauser et al. U.S. Pat. No. 5,862,203) describe automated agents which provide user message management in the manner specified in claims 1, 15 and 16. Therefore the claims are novel over these other cited references.

The claims as revised are also novel over U.S. Pat. No. 4,837,798 (Cohen et al), U.S. Pat. No. 5,682,460 (HYZIAK et al), EP 0695075 (ATT) and Ramanathan et al "Architectures for personalised multimedia" for the reasons given below.

Cohen et al describes a unified messaging system but does not mention the use of autonomous agents that are arranged to negotiate with one another as specified in amended claim 1. A "User agent" is mentioned at column 5 line 4 but this does not carry out negotiations.

U.S. Pat. No. 5,682,460 to Hyziak does not describe the use of autonomous agents or use of such negotiation.

EP 0695075 (ATT) is listed in the European Search as being of background relevance only. It is directed to a system for estimating the effectiveness and efficiency of a communication device, rather than a message managing system. The ability to negotiate and operate automatically on a user's behalf is not described.

The article "Architectures for personalised multimedia" does not describe a method of message management or use for autonomous agents for user message management. This reference is listed in the European Search as being of technological background only.

Claim rejections—35 U.S.C. §103

11. Wulkan U.S. Pat. No. 5,862,201 describes a telecommunications call management system which chooses the optimum route and carrier for zi particular call. It is not concerned with different message formats such as e-mail, fax and SMS; rather it relates to telephone calls only and involves dialling pre-fix numbers for chosen carriers to reduce costs. Wulkan does not describe use of autonomous agents to determine which format to send or display messages in, according to user preferences and information about a communications network.

Wulkan U.S. Pat. No. 5,862,203 mentions user preferences at column 4 line 18–19. These are described as being stored in a personal data database which also holds details of the subscribers location. However, these are not user preferences for message formats as specified in amended claim 1. Wulkan is concerned with choosing optimum routes and carriers to reduce costs and not with determining a message format such as e-mail, fax, SMS or voice transactions.

Neither Thor (U.S. Pat. No. 5,448,564, U.S. Pat. No. 5,533,017) nor Wulkan describe using an autonomous agent to determine a user message format on the basis of user preferences for message formats and information about a communications system. The present application addresses the problems faced by users in managing their e-mail, fax, telephone and other messages as described on page 1 and 2 of the description. Thor and Wulkan do not address these problems and so would not have been considered by a skilled person in the art. By using an autonomous agent as specified in claims 1, 15 and 16 many advantages are achieved as specified on page 11. Even if the person skilled in the art had considered the Thor and Wulkan references he would not have reached the present invention as specified in claim 1. For these reasons it is submitted that the revised claims are allowable over the cited references to THOR and WULKAN.

Also, THOR (U.S. Pat. No. 5,448,564) at column 2 line 15–16 directs the reader away from voice and video applications whereas voice is one type of message format used in the present application.

As described at page 3 lines 16 onwards of the present application, agent based methods have not previously been applied to user message management. This is illustrated by the fact that the unified message system of Cohen et al and the system of Hyziak are concerned with the problems users face with message management but do not consider autonomous agents as a possible approach. As described at page 3 lines 21 to 34 of the present application, agent based systems are problematic in ways that until the present invention were thought especially significant for message management. For these reasons it is submitted that a person skilled in the art would not have looked to documents about autonomous agents when addressing message management. Even if the skilled person had looked to documents about autonomous agents, such as the Ramanathan article, these direct him away from using autonomous agents for message management. For example the Ramanathan article focuses on high cost of storage and transmission of multimedia services which is not related to user message management.

In view of the foregoing, it is submitted that this application is in condition for allowance, and the Examiner's further and favorable reconsideration in that regard is urged.

An information disclosure statement is also submitted herewith, along with the required fee.

Further action by the Examiner is awaited.

What is claimed is:

1. A method of message management in a communications network comprising a plurality of automated agents arranged to negotiate with one another, said method comprising the steps of:
   (i) storing information comprising information about the communications network and user preference for message formats;
   (ii) storing at least one user message in one of a first plurality of formats, said message being required to be sent using the communications network;
   (iii) negotiating, using one of said automated agents with one or more other of said automated agents; and
   (iv) using said one automated agent, determining on the basis of said negotiation and said information which of a second plurality of formats to send the user message in.

2. The method as claimed in claim 1 which further comprises the step of determining, on the basis of the information, a time at which to send the user message.

3. The method as claimed in claim 1 wherein said information further comprises information about costs.

4. The method as claimed in claim 1 which further comprises the step of converting the user message to the determined format for sending.

5. The method as claimed in claim 2 which further comprises the step of automatically sending the user message at the determined time.

6. The method of message management as claimed in claim 1 which further comprises the steps of:
  (i) storing at least one user message received from the communications network in one of a plurality of formats; and
  (ii) determining, on the basis of the preferences which of a plurality of formats to display the user message in.

7. The method as claimed in claim 1 which further comprises the steps of:
  (i) obtaining information about past user message transmissions; and
  (ii) modifying the stored information on the basis of the past user message transmission information.

8. The method as claimed in claim 1 wherein said step (i) of storing information further comprises the steps of:
  (i) sending a request for information to an entity in the communications network, said information being associated with that entity;
  (ii) receiving a reply to the request;
  (iii) updating the stored information according to the reply.

9. The method as claimed in claim 8 wherein said information associated with the entity comprises information about preferences for message formats.

10. The method as claimed in claim 8 wherein said information associated with the entity comprises information about costs.

11. The method as claimed in claim 8 wherein said information associated with the entity comprises information about performance of the communications network.

12. The method as claimed in claim 1 wherein said step (i) of storing information about preferences further comprises the step of:
  (i) sending a request for information to a plurality of entities in the communications network, said information being associated with the entities;
  (ii) receiving replies to the request;
  (iii) updating the stored information according to the replies.

13. The method as claimed in claim 1 for use in a terminal for connection into the communications network.

14. A method of message management in a communications network comprising a plurality of automated agents arranged to negotiate with one another, said method comprising the steps of:
  (i) storing information comprising information about the communications network and user preferences for message formats;
  (ii) storing at least one user message received from the communications network in one of a first plurality of formats;
  (iii) negotiating, using one of said automated agents with one or more other of said automated agents; and
  (iv) using said one automated agent, determining, on the basis of the information and said negotiation, which of a second plurality of formats to display the user message in.

15. A terminal for connection into a communications network comprising a plurality of automated agents arranged to negotiate with one another, said terminal comprising:
  (i) a storage device arranged to store information that comprises information about the communications network
  (ii) a second storage device arranged to store at least one user message in one of a first plurality of formats, said user message being required to be sent using the communications network; and
  (iii) a first automated agent arranged to negotiate with one or more other of said automated agents; and wherein said first automated agent is arranged to determine, on the basis of the information and a negotiation between said first automated agent and another of said agents, which of a second plurality of formats to send the user message in.

16. The terminal as claimed in claim 15 wherein said first automated agent is arranged to determine, on the basis of the information, a time at which to send the message.

17. The terminal as claimed in claim 15 which further comprises a converter, arranged to convert the message to the determined format for sending.

18. The terminal as claimed in claim 16 which further comprises a provision arranged to automatically send the message at the determined time.

* * * * *

UNITED STATES PATENT AND TRADEMARK OFFICE
CERTIFICATE OF CORRECTION

PATENT NO. : 6,055,240
DATED : April 25, 2000
INVENTOR(S) : Andrew Tunnicliffe

It is certified that error appears in the above-identified patent and that said Letters Patent is hereby corrected as shown below:

<u>Column 8, line 5, through Column 10, line 38,</u>
Should be deleted.

Signed and Sealed this

Twenty-seventh Day of August, 2002

*Attest:*

*Attesting Officer*

JAMES E. ROGAN
*Director of the United States Patent and Trademark Office*